United States Patent [19]

Sekiguchi et al.

[11] Patent Number: 4,951,154
[45] Date of Patent: Aug. 21, 1990

[54] MAGNETO-OPTIC RECORDING/REPRODUCING APPARATUS

[75] Inventors: Toru Sekiguchi; Yoshihiro Sasaki, both of Tokyo, Japan

[73] Assignee: NEC Corporation, Japan

[21] Appl. No.: 149,565

[22] Filed: Jan. 28, 1988

[30] Foreign Application Priority Data

Jan. 28, 1987 [JP] Japan .................................. 62-19123
Mar. 26, 1987 [JP] Japan .................................. 62-73273

[51] Int. Cl.$^5$ .......................... H04N 5/85; H04N 5/94
[52] U.S. Cl. .................................................. 358/336
[58] Field of Search ................ 358/336, 340, 314, 327; 360/38.1; 369/54, 58, 110

[56] References Cited

U.S. PATENT DOCUMENTS

| | | | |
|---|---|---|---|
| 4,268,745 | 5/1981 | Okano | 369/44 |
| 4,338,682 | 7/1982 | Hosaka et al. | 369/44 |
| 4,340,950 | 7/1982 | Kosaka | 369/44 |
| 4,414,655 | 11/1983 | Shoji et al. | 369/44 |
| 4,467,462 | 8/1984 | Shibata | 369/46 |
| 4,541,084 | 9/1985 | Oku et al. | 369/45 |
| 4,544,838 | 10/1985 | Musha et al. | 369/46 |
| 4,587,644 | 5/1986 | Fujiie | 369/46 |
| 4,680,744 | 7/1987 | Kanamaru | 369/44 |
| 4,730,290 | 3/1988 | Takasago et al. | 369/46 |
| 4,748,610 | 5/1988 | Nakata et al. | 369/46 |
| 4,751,695 | 6/1988 | Kaku et al. | 369/46 |

Primary Examiner—Donald McElheny, Jr.
Attorney, Agent, or Firm—Ostrolenk, Faber, Gerb & Soffen

[57] ABSTRACT

Disclosed is a magneto-optic recording/reproducing apparatus capable of detecting small size defects in a magneto-optic recording disk in the order of tens of microns in size, and capable of reliably compensating for signal defects of a video image recorded on the disk. In the apparatus first and second photodetectors are provided for detecting information signals of two luminous fluxes into which a luminous flux emitted from a laser oscillator is divided by light splitting means. The photodetectors are arranged on the part of light reflected or emitted by the surface of a magneto-optic recording medium when it is irradiated with the luminous flux from the laser oscillator. According to the invention, the signals produced by the photodetectors are processed to produce a highly sensitive defect signal or a plurality of highly sensitive defect signals which may be summed together.

4 Claims, 4 Drawing Sheets

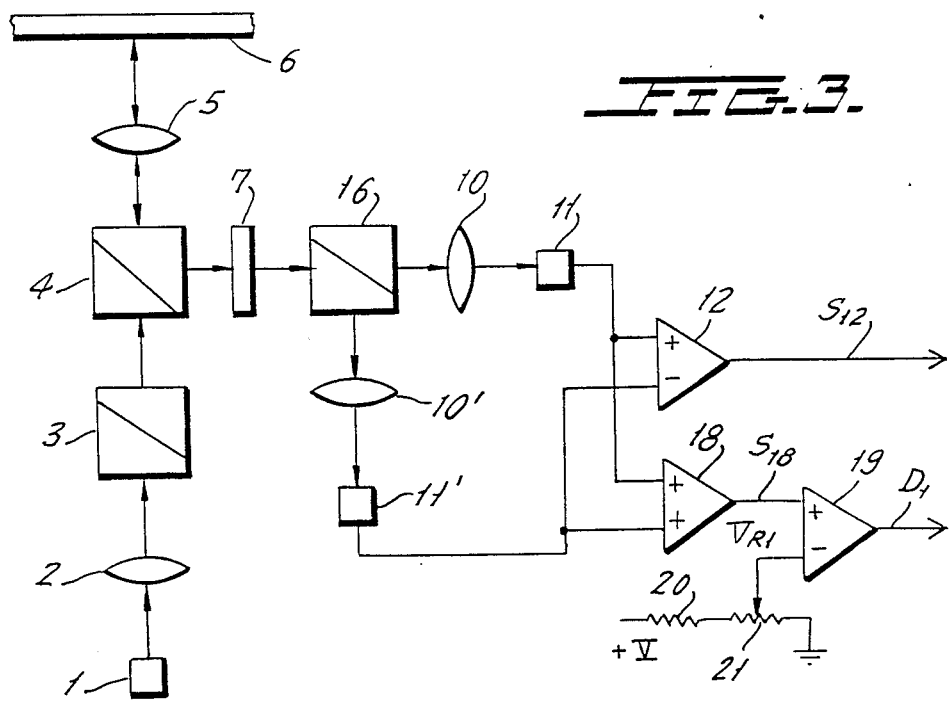
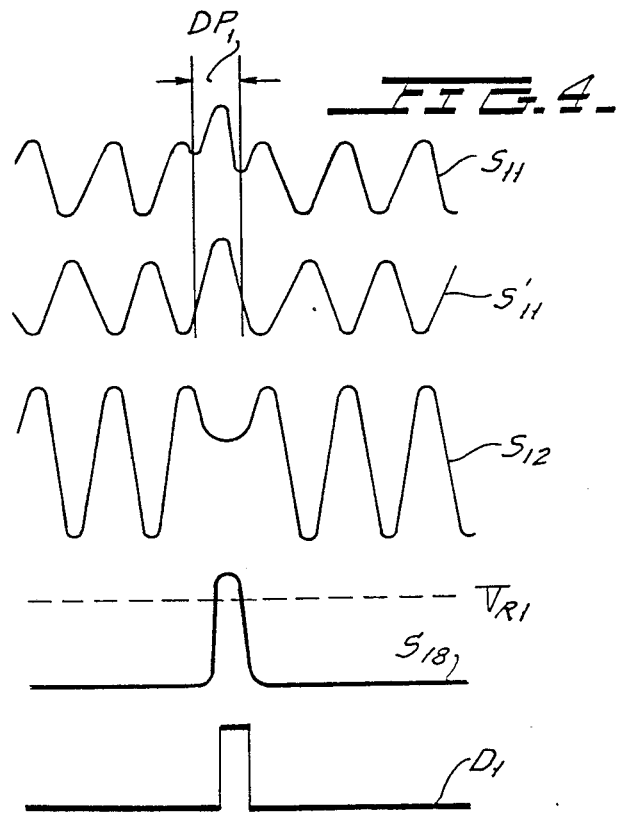

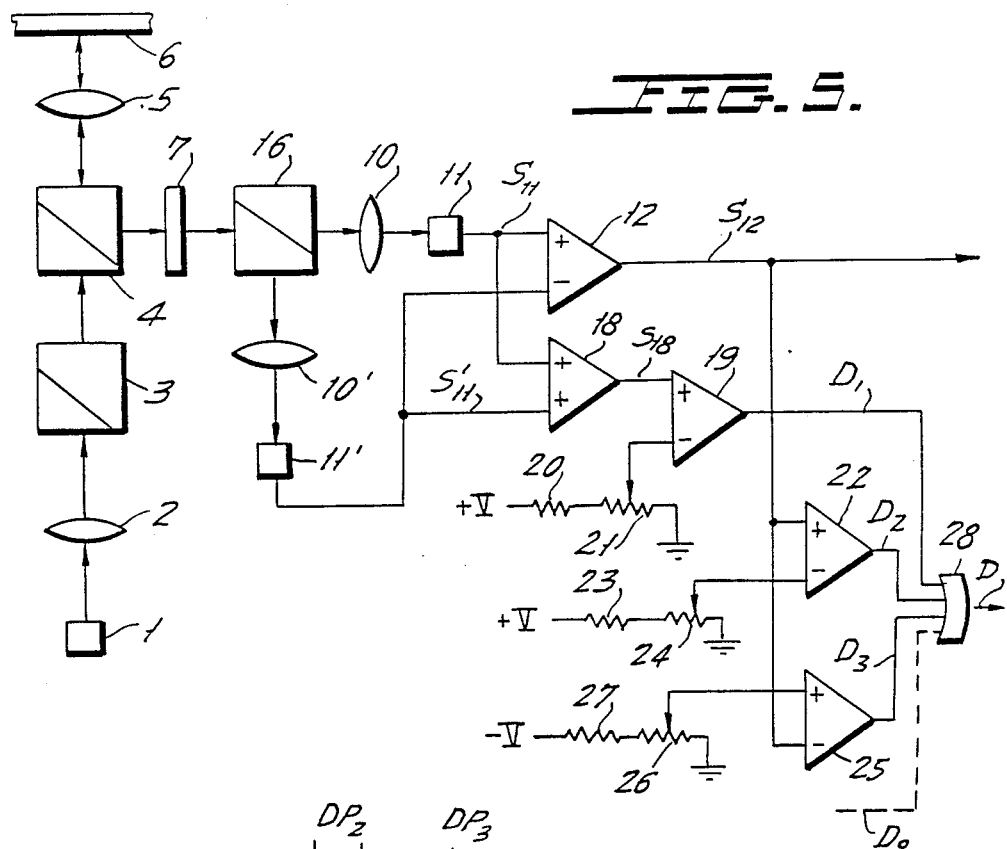
FIG. 5.
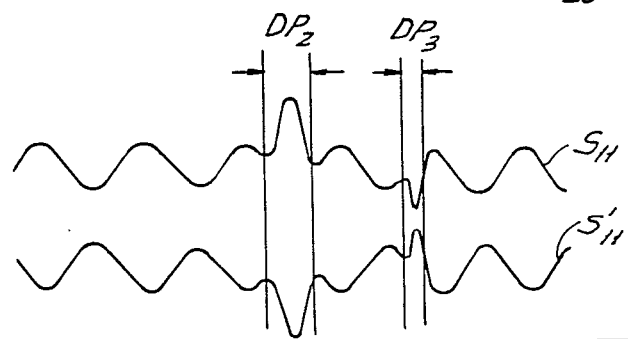
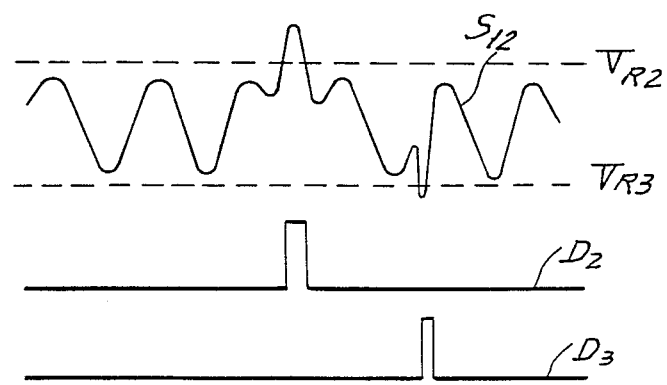
FIG. 6.

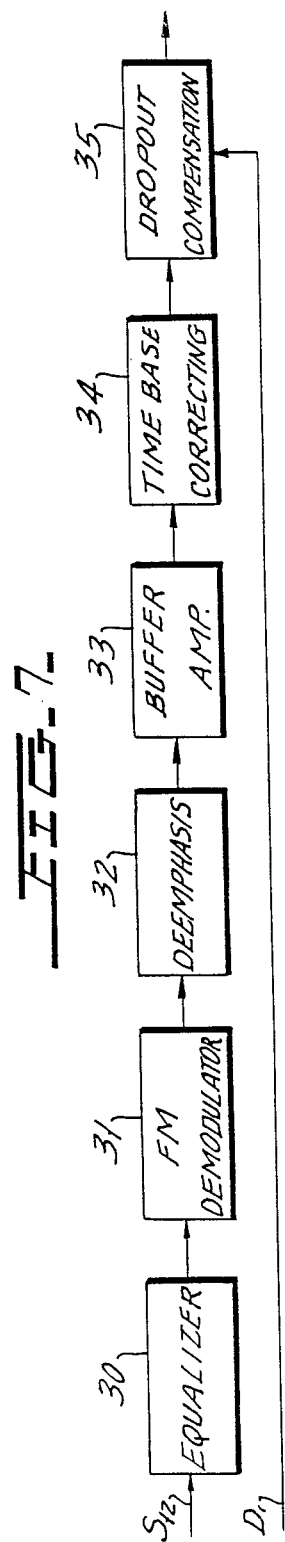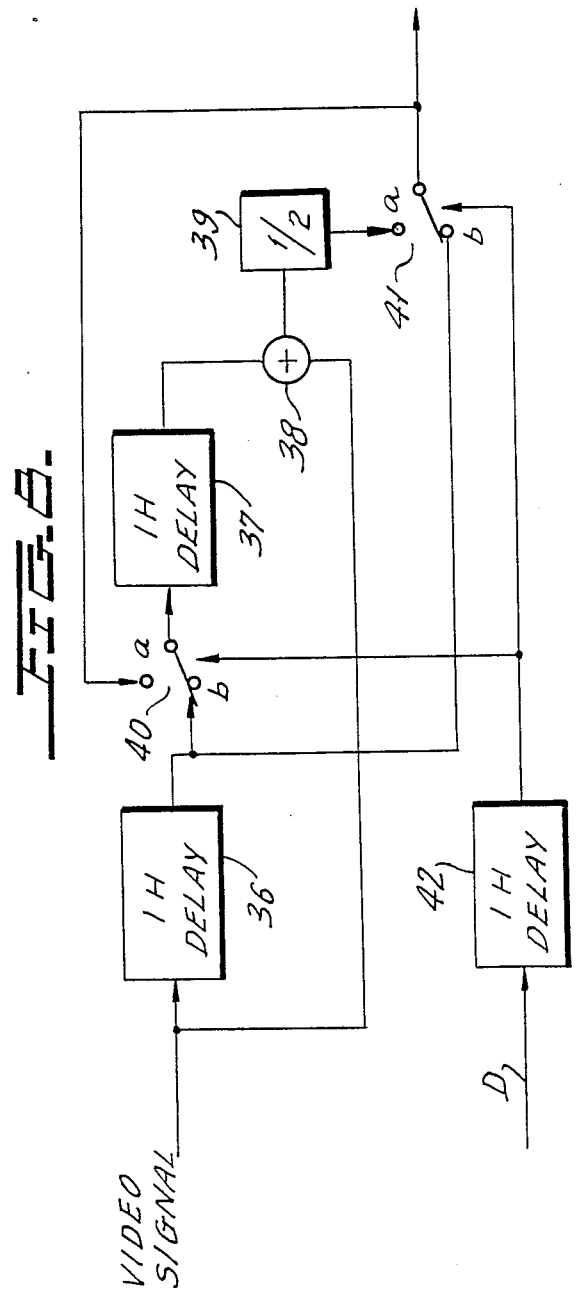

MAGNETO-OPTIC RECORDING/REPRODUCING APPARATUS

BACKGROUND OF THE INVENTION

The present invention relates to a magneto-optic recording/reproducing apparatus which records and reproduces a video signal by the use of a magneto-optic recording disk, and more particularly to an improvement for detecting a defect contained in a magneto-optic recording disk.

By utilizing a magneto-optic recording disk, a video signal and a data signal are conventionally recorded and reproduced. In recording/reproducing operation of the magneto-optic recording disk, magneto-optical effects known as the Kerr effect and the Faraday effect are utilized. Namely, in a recording process, a magnetized condition of a magneto-optic recording medium on the disk surface is changed in accordance with the state of a signal, while, in a reproducing process, a signal having a level corresponding to the magnetized condition is extracted. With regard to a magneto-optic recording disk, it is customary to contain defects on the disk surface. Therefore, in a magneto-optic recording/reproducing apparatus, signal noise or a signal dropout portion associated with such disk defect is detected and compensated by signal processing. This compensation is well known as dropout compensation in the field of video tape recording/reproducing.

Defects in a magneto-optic recording disk are usually classified as dust that adheres to the disk in its manufacturing process, and unevenness of a recording layer, that occurred in the process of its formation by sputtering. In the area of defective parts on the disk, the reflective ratio is different from that of normal parts. Generally, the reflective ratio is greater if the defect is dust, or is lower if it is unevenness. In a typically available magneto-optic recording disk, most defects are derived from dust and are on the order of tens of microns in size. Further, defects of hundreds of microns or larger in size, which are derived from unevenness, are also contained.

In a conventional magneto-optic recording/reproducing apparatus which processes a video signal with frequency modulation, only the larger size defects in the order of hundreds of microns or above are detected from a reproduced video signal and signal compensation is performed on the basis of the defect detection.

In other words, conventionally, most of the small size defects on the magneto-optic recording disk are not detected and therefore the level of signal compensation is sufficient. As a result, it is impossible to produce a video signal of high resolution or of high quality.

SUMMARY OF THE INVENTION

An object of the present invention, therefore, is to provide a magneto-optic recording/reproducing apparatus capable of detecting small size defects in a magneto-optic recording disk in the order of tens of microns in size, and of reliably compensating for signal defects of a video image recorded on the disk.

According to the present invention, there is provided a magneto-optic recording/reproducing apparatus comprising first and second photodetectors for detecting information signals of two luminous fluxes into which a luminous flux emitted from a laser oscillator is divided by light splitting means. The photodetectors are arranged on the path of light reflected or transmitted by the surface of a magneto-optic recording medium when it is irradiated with the luminous flux from the laser oscillator. A differential amplifier is included for detecting a difference signal between the two information signals by means of the first and second photodetectors. Additionally included is a summing amplifier for detecting a sum signal between the two information signals from said first and second photodetectors, and an amplitude detector circuit for detecting any surpassing of the output signal of the summing amplifier above a predetermined reference voltage.

BRIEF DESCRIPTION OF DRAWINGS

FIG. 3 is a block diagram of a first preferred embodiment according to the present invention;

FIG. 4 is a waveform diagram for explaining a defect detecting operation of the embodiment shown in FIG. 3;

FIG. 5 is a block diagram of a second preferred embodiment according to the present invention;

FIG. 6 is a waveform diagram for explaining a defect detecting operation of the embodiment shown in FIG. 5;

FIG. 7 is a block diagram of a video signal reproducing process, based on a defect detection signal; and FIG. 8 is a block diagram of a dropout compensator shown in FIG. 7.

PREFERRED EMBODIMENTS OF THE INVENTION

First will be described the outline of a system for detecting defects contained in a photomagnetic recording disk in a conventional magneto-optic recording/reproducing apparatus.

Figure 1:
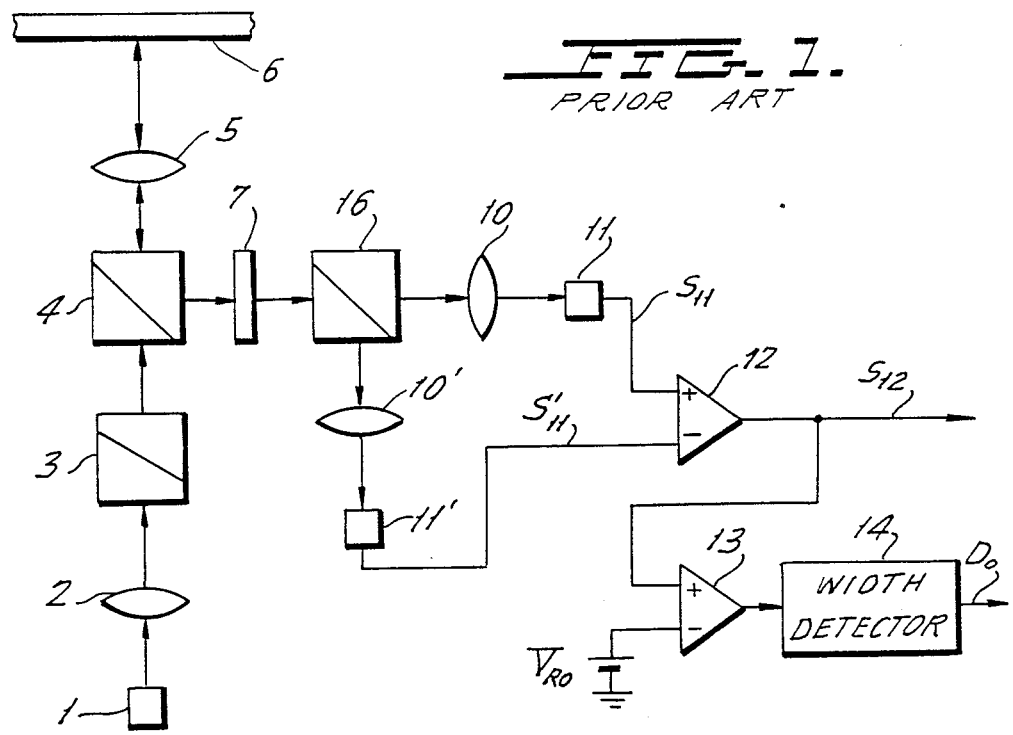
FIG. 1 is a block diagram illustrating the structure of a defect detecting system in a conventional magneto-optic recording/reproducing apparatus.

Referring to FIG. 1, a laser beam emitted from a semiconductor laser 1 is collimated into parallel light by a collimator lens 2, and, through a polarizing element 3, a beam splitter 4 and an objective lens 5, it is radiated to a surface of a magneto-optic recording medium (disk) 6. At this time, the polarization of reflected light varies in accordance with the magnetization condition of the magneto-optic recording disk 6. The reflected light again passes the objective lens 5, the beam splitter 4 and a ½ wavelength plate 7, and is sent to a polarized beam splitter 16, which splits the reflected light into two beams. The split light beams are supplied to photodetectors 11 and 11' through a lens 10 and another lens 10', respectively. The resultant reproduced signals from the photodetectors 11 and 11' are differentially amplified by a differential amplifier 12 so as to obtain a reproduced frequency-modulated video signal (a radio frequency (RF) signal) $S_{12}$. The differential process of the differential amplifier 12 is intended to remove a common phase noise due to fluctuations of the reflected light from the disk 6.

Figure 2:
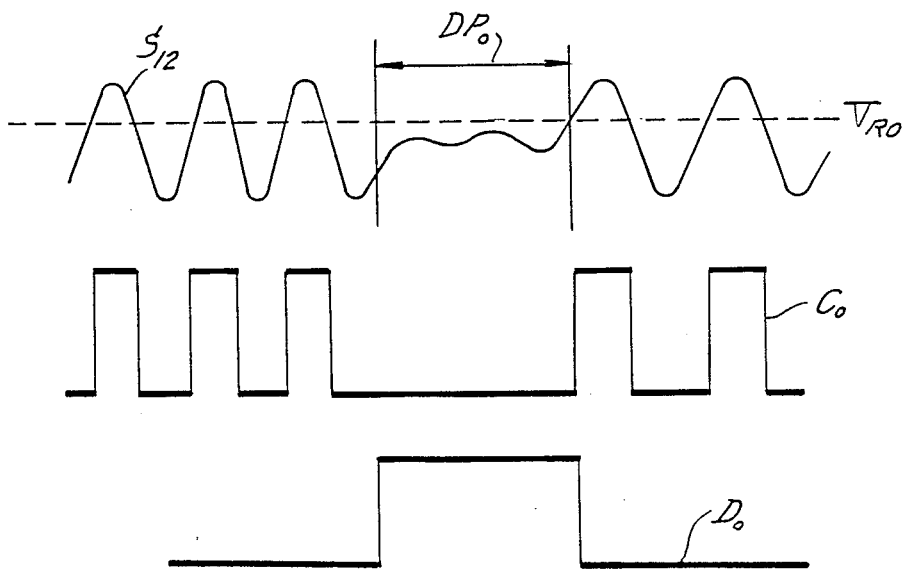
FIG. 2 is a waveform diagram for explaining a conventional defect detecting operation of the system shown in FIG. 1.

Then, the output RF signal $S_{12}$ from the differential amplifier 12 is fed to an amplitude comparator 13, where the RF signal is compared with a reference voltage $V_{R0}$, and the compared output is supplied to width detector 14. The width detector 14 produces a defect detection signal when the period, during which the level of the RF signal is below the reference voltage $V_{R0}$, becomes longer than a predetermined period. FIG. 2 illustrates the operation of this defect detection, in which the reproduced RF signal $S_{12}$, the reference voltage $V_{R0}$, compared output Co, and the defect detection signal Do are indicated. Referring to FIG. 2, the reproduced RF signal $S_{12}$ is converted into the compared output signal Co of a pulse train by being compared with the reference voltage $V_{R0}$. Meanwhile, no pulse train is produced when the level of the RF signal $S_{12}$ is lower than the reference voltage $V_{R0}$ in amplitude. The width detector 14 judges the period of the pulse train in the compared output signal Co and produces the defect detection signal Do when the period of the pulse train exceeds a predetermined period.

As described, the conventional magneto-optic recording/reproducing apparatus detects only the relatively large size defect corresponding to a portion having the lower reflective ratio.

FIG. 3 illustrates a first preferred embodiment of the present invention. This embodiment has the same configuration as that of FIG. 1 until the point where a reproduced RF signal is delivered from the differential amplifier 12, and, accordingly, the description of the corresponding parts is omitted.

This embodiment is further equipped with a summing amplifier 18 for extracting a sum signal of reproduced RF signals from the photodetectors 11 and 11', and a comparator 19 for comparing the output of the summing amplifier 18 and a reference voltage $V_{R1}$ to detect any surpassing of the output of the summing amplifier 18 to the reference voltage $V_{R1}$. The reference voltage $V_{R1}$ is produced by combination of a potentiometer 20 and a fixed resistor 21, which are inserted between a power source $+V$ and the grounding.

Now will be described the operation of this preferred embodiment with reference to FIG. 4 explaining the operation of the embodiment illustrated in FIG. 3. This embodiment has the capability of detecting a defect of the magneto-optic disk at which the reflective ratio increases. In reproduction of normal parts where the plane of polarization of a reflected light is rotated by the Kerr effect, the reproduced RF signals from the photodetectors 11 and 11' are reverse in phase to each other. Meanwhile, they are common in phase in the reproduction of parts where a reflected luminous energy varies due to a change in the reflective ratio or the like. Therefore, in the reproduction of the normal part, a certain reproduced RF signal is delivered from the differential amplifier 12, but no signal is delivered from the summing amplifier 18. On the other hand, in the reproduction of a defective part, no signal is delivered from the differential amplifier 12, but a signal having a sufficient level is delivered from the summing amplifier 18.

FIG. 4 shows the reproduced RF signals $S_{11}$ and $S'_{11}$ from the photodetectors 11 and 11', respectively, and these output signals 11 and 11' contain a component corresponding to a defective part $DP_1$ due to a variation in the reflective ratio. In the output signal $S_{18}$ of the summing amplifier 18, a signal level is significantly raised at the defective part $DP_1$. Therefore, the output signal $S_{18}$ is compared by the comparator 19 with the reference voltage $V_{R1}$ and thus, a defect detection signal $D_1$ is produced. Accordingly, this embodiment can reliably detect such defect as locally raises the reflective ratio.

Whereas the first embodiment of FIG. 3 detects defects accompanying raised changes in the reflective ratio, the photomagnetic recording disks also have defects involving variations in the Kerr rotational angle. The latter are due to uneven thicknesses of a recording medium layer and a protective layer of a disk, resulting from quantitave variations in enhancing effect of the Kerr rotational angle. Generally, such defect has a trend of increasing the Kerr rotational angle. Whereas the reproduced RF signals of the two photodetectors 11 and 11' (FIG. 3) are in reverse phase to each other irrespective of the presence or absence of defect under the Kerr effect; defective parts, where the reflected light more significantly changes its phase, results in greater values in the output of the differential amplifier 12 than the amplitudes of the normal reproduced RF signal. A second preferred embodiment of the present invention is provided so as to be able also to detect the defect involving variations in the Kerr rotational angle.

The second preferred embodiment of the present invention, as illustrated in FIG. 5, further includes, in addition to the configuration of FIG. 3, a comparator 22 for comparing the reproduced RF signal $S_{12}$ from the differential amplifier 12 with a reference voltage $V_{R2}$ which is produced by a resistor 23 and a potentiometer 24, a comparator 25 for comparing the reproduced RF signal $S_{12}$ with a reference voltage $V_{R3}$ which is produced by a potentiometer 26 and a resistor 27, and a OR gate 28. In the comparator 22, the reproduced RF signal $S_{12}$ is supplied to a non-reversed input terminal. To the contrary, it is supplied to a reversed input terminal in the comparator 25.

FIG. 6 is a diagram for explaining the operation of the second embodiment shown in FIG. 5. In FIG. 6, the reproduced output signals $S_{11}$ and $S'_{11}$ are reverse in phase to each other and include components corresponding to defective parts $DP_2$ and $DP_3$. Therefore, the output RF signal $S_{12}$ of the differential amplifier 12 significantly has a component with a high level corresponding to the defective parts. By comparing the output signal $S_{12}$ with the reference voltages $V_{R2}$ and $V_{R3}$, the comparators 22 and 25 deliver the defect detection signals $D_2$ and $D_3$, respectively. Further, by the OR gate 28, the detection signals $D_2$ and $D_3$ are cumulated with the defect detection signal $D_1$ from the comparator 19 due to a change in the reflective ratio.

As described above, when the output RF signal $S_{12}$ of the differential amplifier 12 has a level greater than the reference voltage $V_{R2}$ in the comparator 22 or less than in respective than the reference voltage $V_{R3}$ in the comparator 25, defect detection signals $D_2$ or $D_3$ is produced. The OR gate 28 delivers the final defect detection signal D by summing the defect detection signals $D_1$, $D_2$ and $D_3$. Further, the OR gate 28 may receive the defect detection signal $D_0$ produced in FIG. 1. The second embodiment, as so far described, can reliably detect not only defects of the variation in the reflective ratio but also defects resulting from changes in the Kerr rotational angle. Accordingly, a defect compensating circuit can accurately compensate the defect in a reproduced video signal on the basis of the final defect detection signal D.

Next will be explained how the defect in a video signal is compensated on the basis of the disk defect detection signal according to the present invention. FIG. 7 is a block diagram illustrating reproduced signal processing. In FIG. 7, the reproduced RF output signal $S_{12}$ from the differential amplifier 12 (FIGS. 3 and 5) is applied to an equalizer 30 where a frequency characteristic of a recording/reproducing apparatus is equalized, and supplied to a frequency demodulator 31 where the signal is demodulated into a baseband video signal. After this, the demodulated video signal is applied through a deemphasis circuit 32, a buffer amplifier 33 and a time base correcting circuit 34, to a dropout compensating circuit 35.

FIG. 8 is a block diagram of the dropout compensating circuit 35 shown in FIG. 7. The dropout compensating circuit 35 comprises video line delays (1H delay) 36 and 37 having a delay time of one horizontal scanning period, an adder 38, a coefficient circuit 39 of ½, selectors 40 and 41, and a defect detection signal delay 42 having a delay time of one horizontal scanning period, as shown in FIG. 8.

The operation of the dropout compensating circuit 35 of FIG. 8 is as follows. In the absence of the defect detection signal (the dropout signal) during normal reproduction, both selectors 40 and 41 are on a b side, and the video signal passes the 1H delay circuit 36 before it is delivered externally. As the dropout signal emerges at the output of the detection signal delay 42, the selectors 40 and 41 are turned to the a side, and the output of the coefficient circuit 39 is delivered externally and supplied through the selector 40 into the 1H delay 37 to achieve dropout compensation. In FIG. 8, a video signal component for the dropout compensation is produced by use of the correlativity of a TV signal, i.e., by combining video signal components of contiguous lines free from the dropout occurrence.

As hitherto described, the present invention makes it possible to detect not only defects accompanying variations in the reflective ratio but also defects involving variations in the Kerr rotation in the magneto-optic recording medium, and accordingly has the benefit of significantly improving the ability to detect defective parts of the small size.

Especially in an analog type magneto-optic recording/reproducing apparatus for recording and reproducing a frequency-modulated video signal, it is possible to sufficiently compensate signal defects (i.e. noise) by controlling a dropout compensating circuit by the defect detection result according to the invention, resulting in a high-resolution reproduced image in which noise is inconspicuous.

What is claimed is:

1. A video signal reproducing apparatus using a magneto-optic recording disk and compensating for a defect in said disk, the apparatus comprising:
    two photodetector means for producing two respective, reproduced signals reverse in phase to each other from said magneto-optic recording disk in which a frequency-modulated video signal is recorded;
    differential amplifier means for producing a signal representing a difference between said two reproduced signals delivered from said two photodetector means;
    adder means for producing a signal representing a sum as between said two reproduced signals delivered from said two photodetector means;
    comparator means for comparing said sum signal delivered from said adder means with a predetermined threshold to generate a detection signal indicating detection of a defect in said disk when said sum signal is above said threshold;
    demodulator means for demodulating said difference signal from said differential amplifier means to produce a processed video signal; and
    video image compensating means responsive to said detection signal for compensating a component of said processed video signal impaired by a defect in said disk by producing a substitute video signal component derived from combining video signal components contiguous to said impaired component.

2. A video signal reproducing apparatus comprising:
    two photodetector means for extracting two respective reproduced signals reverse in phase to each other out of a magneto-optic memory disk in which a frequency-modulated wave of a video signal is stored;
    differential means for extracting an output representing a difference between said two reproduced signals from said two photodetector means;
    adder means for extracting an output representing a sum as between said two reproduced signals from said two photodetector means;
    first comparator means for comparing said sum output from said adder means with a first predetermined threshold and producing a first detection signal indicative of detection of a defect in said disk when the sum output is above said first threshold;
    second comparator means for comparing said difference output from said differential means with a second predetermined threshold and reproducing a second detection signal indicative of detection of a defect in said disk when said difference output is above said second threshold;
    OR gate means for obtaining the logical sum of the first and second detection signals from said first and second comparator means and producing a video image compensation signal;
    demodulator means for demodulating said difference output from said differential means and producing a reproduced video signal; and
    compensating means responsive to said video image compensation signal for compensating video images of said reproduced video signal.

3. A video image reproducing apparatus as claimed in claim 2, wherein said video image compensation comprises dropout compensation.

4. A video image reproducing apparatus as claimed in claim 2, wherein said second comparator means compares said difference output from said differential means with said second threshold in the positive and negative polarity directions.

* * * * *